(12) United States Patent
Borg et al.

(10) Patent No.: US 7,440,012 B2
(45) Date of Patent: Oct. 21, 2008

(54) METHOD AND APPARATUS FOR OPTIMIZING IMAGE SENSOR NOISE AND DYNAMIC RANGE

(75) Inventors: Matthew Michael Borg, Albany, OR (US); Dietrich Werner Vook, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 812 days.

(21) Appl. No.: 10/427,318

(22) Filed: Apr. 30, 2003

(65) Prior Publication Data

US 2004/0218088 A1  Nov. 4, 2004

(51) Int. Cl.
*H04N 5/225* (2006.01)
(52) U.S. Cl. .................. 348/229.1; 348/364; 348/372
(58) Field of Classification Search ............. 348/229.1, 348/362, 364, 372
See application file for complete search history.

(56) References Cited

U.S. PATENT DOCUMENTS

| | | | |
|---|---|---|---|
| 4,860,108 A | * | 8/1989 | Saito et al. ............... 348/230.1 |
| 5,631,705 A | * | 5/1997 | Tani ............................ 348/314 |
| 6,108,037 A | * | 8/2000 | Takei ........................ 348/224.1 |
| 6,690,000 B1 | * | 2/2004 | Muramatsu et al. ...... 250/208.1 |
| 6,881,941 B1 | * | 4/2005 | Janesick ..................... 348/308 |
| 6,911,640 B1 | * | 6/2005 | Bencuya et al. ............. 348/308 |
| 7,038,820 B1 | * | 5/2006 | Kindt et al. ................. 348/310 |
| 7,236,192 B2 | * | 6/2007 | Kakumoto et al. ....... 348/229.1 |
| 2001/0038064 A1 | | 11/2001 | Mori et al. |
| 2003/0174226 A1 | * | 9/2003 | Ahn et al. ................... 348/294 |

FOREIGN PATENT DOCUMENTS

| JP | 2001197376 A | 7/2001 |
|---|---|---|
| JP | 2001217182 | 8/2001 |
| JP | 2001217182 A | 8/2001 |

* cited by examiner

*Primary Examiner*—Lin Ye
*Assistant Examiner*—Gevell Selby
(74) *Attorney, Agent, or Firm*—RatnerPrestia

(57) ABSTRACT

A method and apparatus for optimizing the voltage supply of an image sensor pixel array to minimize pixel noise and maximize dynamic range is disclosed. The voltage supply is adjusted in response to the exposure level of the pixel array when it captures an image. The voltage supply is increased in higher exposure levels to expand the dynamic range of the pixel array. In lower exposure levels, when the full dynamic range of the pixel array is not utilized, the voltage supply is decreased to lower pixel noise level and reduce its effect on image quality.

19 Claims, 4 Drawing Sheets

METHOD AND APPARATUS FOR OPTIMIZING IMAGE SENSOR NOISE AND DYNAMIC RANGE

FIELD OF THE INVENTION

The invention is directed towards the field of image sensors, and more specifically, towards optimizing noise and dynamic range in the image sensors.

BACKGROUND OF THE INVENTION

An image sensor uses an array of pixels to capture an image when the image sensor is exposed to light. FIG. 1 shows a block diagram of an illustrative prior art pixel array 103. Pixel array 103 includes auxiliary circuitry such as drivers, buffers, and multiplexers for the signals in the array. A voltage supply 105 supplies the pixel array 103 with power. At the beginning of an exposure period, a reset signal 107 is asserted to reset some or all of the pixels in the pixel array 103. Consequently, the pixels are charged to a reset voltage, which is typically a function of the voltage supply 105. As the pixel array 103 is exposed to incident light 109, the voltages at each pixel decrease.

At the end of an exposure period, the final voltage of each pixel is compared to its original reset voltage. These voltage swings represent the captured image, and are proportional to the exposure level of the pixel array 103. Large voltage swings indicate a high exposure level, which means that the pixel array 103 was exposed to bright light or had a long exposure period. Conversely, small voltage swings indicate a low exposure level, which means that the pixel array 103 was exposed to dim light or had a short exposure period. The voltage swings are read from the pixel array 103 as image signals 111.

A higher voltage supply increases the dynamic range of a pixel array, because each pixel has a larger reset voltage, and thus a bigger range for the voltage swing. A larger dynamic range allows the pixel array to capture a more faithful image when the exposure level is high. However, both pixel temporal noise and dark current noise (hereinafter, collectively referred to as just "noise" or "pixel noise") have been found to increase along with the voltage supply when the pixel array is created with complimentary metal oxide silicon (CMOS) technology. The noise distorts the image captured by the pixel array.

SUMMARY OF THE INVENTION

In accordance with a preferred embodiment of the present invention, a method and apparatus are described for optimizing the voltage supply of an image sensor pixel array. The voltage supply is varied in response to the exposure level of the pixel array when it captures an image. The voltage supply is increased when exposure levels are higher, to increase the reset voltage and expand the dynamic range of the pixel array. When the exposure levels are lower and the full dynamic range of the pixel array is not utilized, the voltage supply is decreased to lower the reset voltage, thus lowering the noise level and reducing its effect on image quality.

In one embodiment of the present invention, the exposure level is determined by checking the gain of a programmable gain amplifier (PGA) that amplifies the signals from the pixel array, before the signals are digitized by an analog-to-digital converter (ADC). A gain control block controls the gain of the PGA to match the signal range from the pixel array to the input range of the ADC to minimize quantization error. A high PGA gain indicates lower signal levels from the pixel array, whereas a low PGA gain indicates higher signal levels from the pixel array. The gain of the PGA is thus an indicator of the exposure level.

In an alternate embodiment of the present invention, the exposure level is determined by comparing the mean signal value from the pixel array to a threshold value. When the mean signal value is above the threshold value, then the pixel array has a high exposure level. When the mean signal value is below the threshold value, then the pixel array has a low exposure level. Alternatively, the exposure level can be determined by comparing the median or maximum signal value from the pixel array to a threshold value.

In another embodiment of the present invention, the pixel array has more than one voltage supply. One or more of the voltage supplies is changed in response to the exposure level of the pixel array to optimize the noise level and dynamic range of the pixel array.

In another embodiment of the present invention, the pixel array may be designed so that its reset voltage is not a function of a voltage supply to the pixel array. In such configurations, the reset voltage may also be optimized independently of the voltage supply to reduce noise levels in response to the exposure level of the pixel array.

Further features and advantages of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

When the pixel array has a high exposure level, the pixel noise is negligible because the image signals are large compared to the pixel noise floor. The large signal-to-noise ratio results in high image quality under high exposure levels. However, the voltage swings of the pixel array may be relatively small under low exposure levels. The signal-to-noise ratio is lower in these conditions and results in poorer image quality. Therefore, the voltage supply to the pixel array is varied in response to its exposure level to optimize the noise levels and dynamic range of the pixel array.

Figure 1:
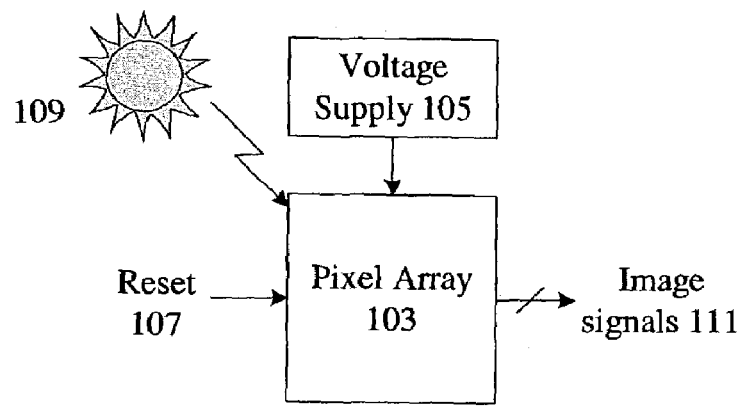
FIG. 1 illustrates a block diagram of a prior art pixel array.
Figure 2:
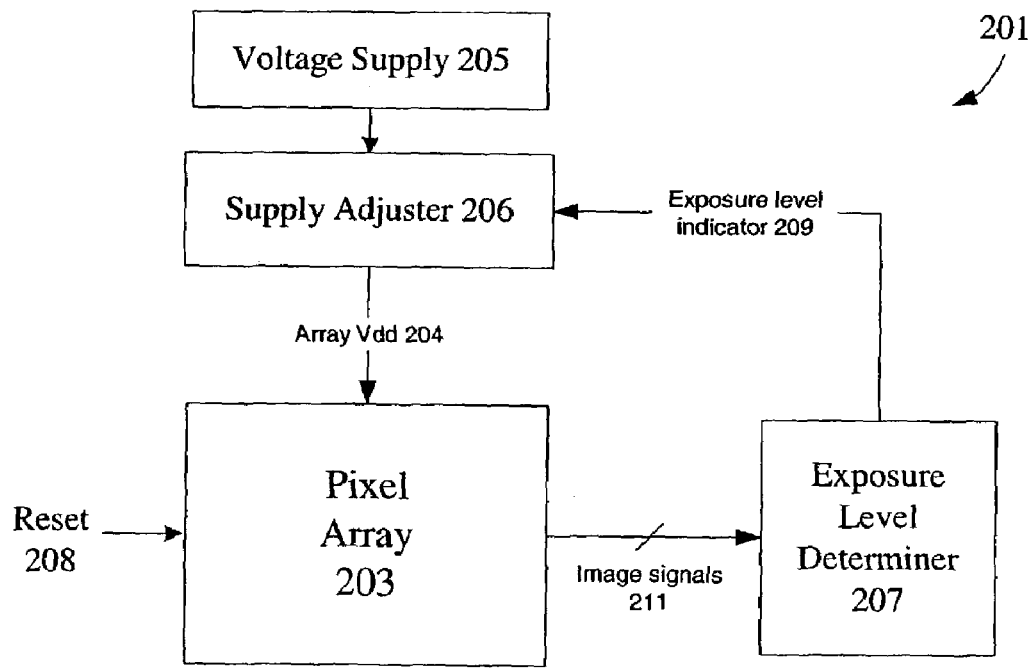
FIG. 2 illustrates a block diagram of a system for optimizing the voltage supply of a pixel array in response to exposure levels, made according to the present invention.

FIG. 2 illustrates a block diagram of a system 201 for optimizing the voltage supply of a pixel array in response to its exposure level, made according to the present invention. A pixel array 203 is used to capture an image, represented by image signals 211. An exposure level determiner 207 determines the exposure level of the image signals 211 and generates an exposure level indicator 209 for feedback to the supply adjuster 206. A supply adjuster 206 adjusts the voltage from a voltage supply 205 to provide an optimized voltage supply (Array Vdd 204) to the pixel array 203. Array Vdd 204 is selected for the optimal balance between noise level and dynamic range at the exposure level indicated by exposure level indicator 209.

For example, when the exposure level determiner 207 indicates that the pixel array 203 has a high exposure level, the supply adjuster 206 increases Array Vdd 204. This allows for greater dynamic range in the pixel array 203. When the exposure level determiner 207 indicates that the pixel array 203 has a low exposure level, the supply adjuster 206 decreases Array Vdd 204. Decreasing Array Vdd 204 does not hurt the dynamic range of the pixel array 203 in low exposure levels, since the voltage swings at each pixel are smaller. Decreasing Array Vdd 204 also reduces the amount of pixel noise, thus improving the signal-to-noise ratio and the quality of images captured under low exposure levels. The criteria for distinguishing low exposure levels from high exposure levels will vary from system to system, depending on factors such as length of exposure time, the pixel sensitivity, intensity of the ambient light, and other system variables. Generally, however, when the image signals 211 are higher than a reference value, the pixel array 203 has a high exposure level. When the image signals 211 are lower than a reference value, the pixel array 203 has a low exposure level.

Figure 3A:
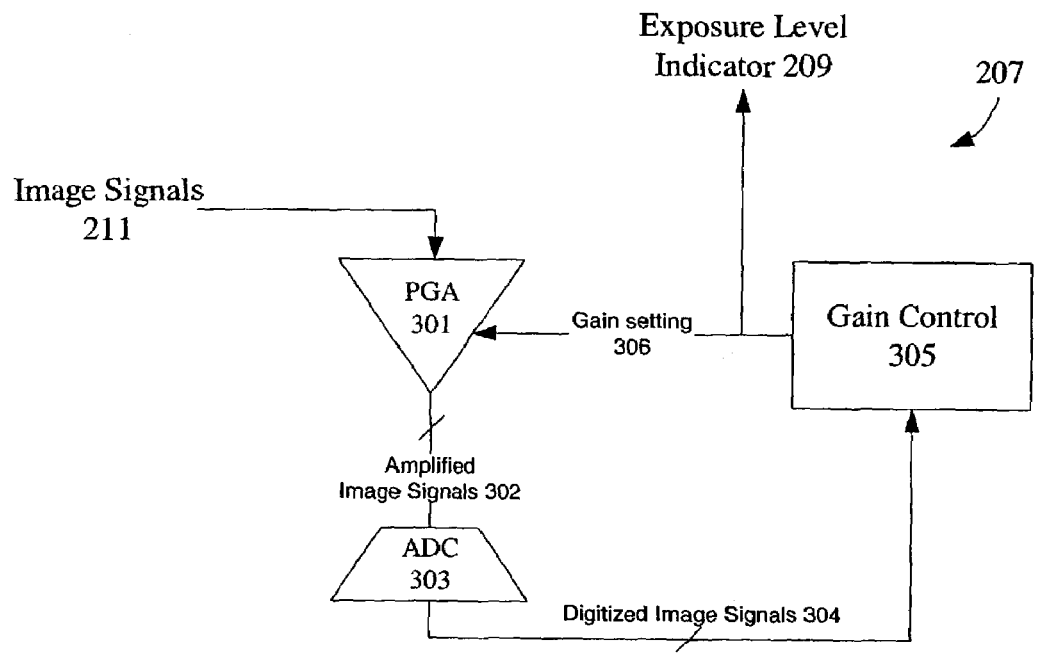
FIG. 3A illustrates one possible implementation for the exposure level determiner in FIG. 2

FIG. 3A illustrates one possible implementation for the exposure level determiner 207 in FIG. 2. The inputs to the exposure level determiner 207 are the image signals 211. The image signals 211 are read from the pixel array 203 and amplified by a programmable gain amplifier (PGA) 301 when needed. Whether amplification is needed or not is discussed further below. Next, the amplified image signals 302 are processed by an analog-to-digital converter (ADC) 303, which converts the amplified image signals 302 into digital form (digitized image signals 304).

Whenever analog signals are digitized, quantization errors occur which introduce additional noise into the digitized signals. If the quantization noise is comparable to or larger than the noise present on the analog signal being digitized, then the quantization noise will degrade the overall signal-to-noise ratio. To minimize the effect of quantization noise, the analog signal may be amplified, such that the signal amplitude is maximized (without exceeding the ADC input range) before the addition of quantization noise. This minimizes the effect of the added quantization noise on the signal-to-noise ratio. Therefore, the PGA 301 amplifies weak image signals to better match the range of the ADC 303. A gain control block 305 analyzes the digitized image signals from the ADC 303 to determine if amplification is needed. For example, if the mean level of the digitized image signals 304 does not meet a target value, the gain control block 305 adjusts the gain setting 306 of the PGA 301 accordingly.

The gain setting 306 of the PGA 301 is therefore an indicator of the exposure levels of the image signals 211. A high gain indicates that the image signals 211 needed to be amplified a considerable amount for input to the ADC 303. Therefore, the pixel array 203 had a low exposure level. Conversely, a low gain indicates that little or no amplification was needed for the image signals 211, and indicates that the pixel array 203 had a high exposure level. The exposure level indicator 209 output from the exposure level determiner 207 is just the gain setting 306 of the PGA 301.

Figure 3B:
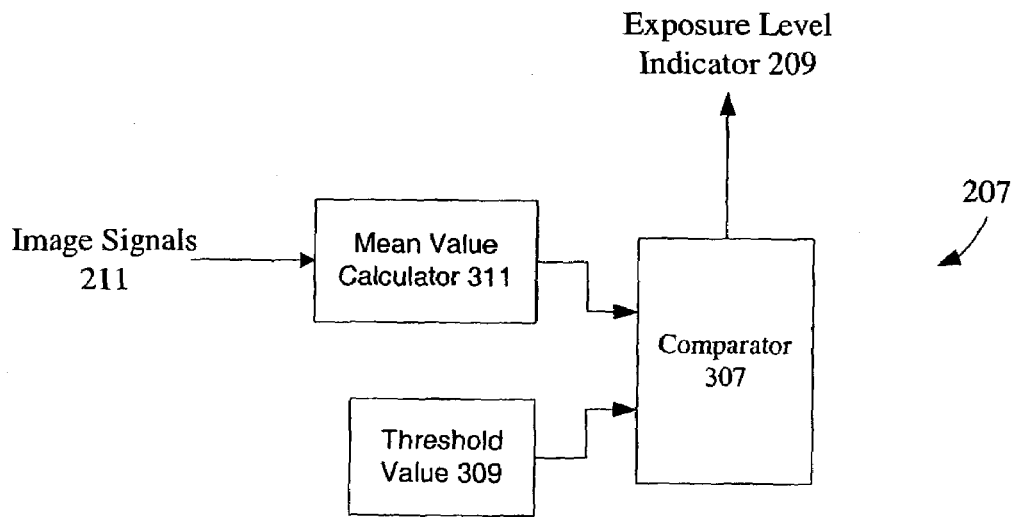
FIG. 3B shows an alternate implementation for the exposure level determiner.

FIG. 3B shows an alternate implementation for the exposure level determiner 207. The mean value of the image signals 211 is calculated by a mean value calculator 311. A comparator 307 compares the mean signal value to a threshold value 309. When the mean signal value is above the threshold value 309, then the pixel array has a high exposure level. When the mean pixel value is below a threshold value 309, then the pixel array has a low exposure level. Alternatively, the comparator 209 can compare the median or maximum signal value from the image signals 211 to a threshold value 309. The exposure level indicator 209 output from this exposure level determiner 207 is simply the output of the comparator 307. Other methods may also be used to determine the exposure level of the pixel array.

Figure 4:
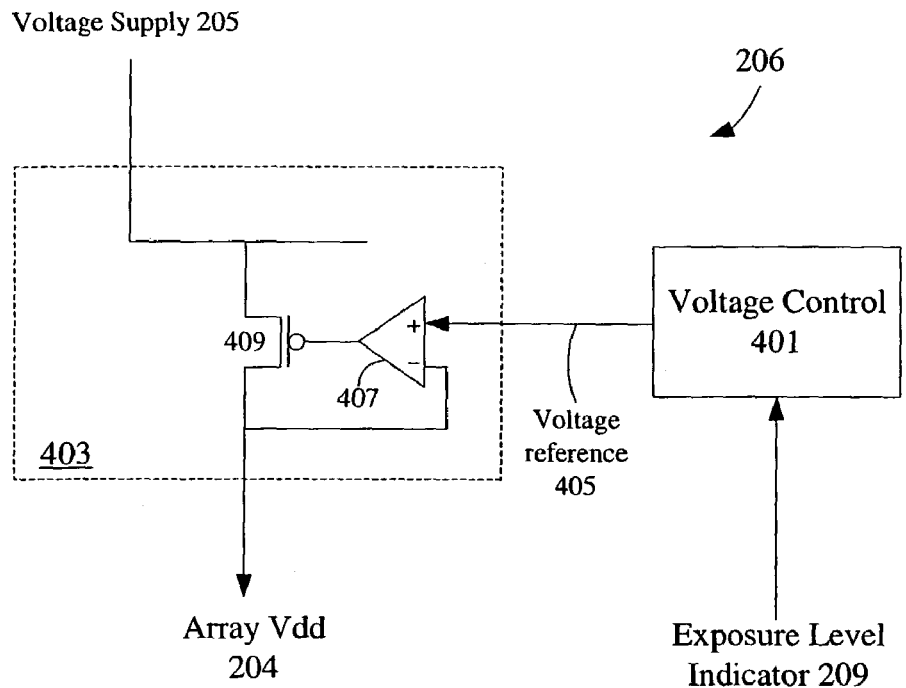
FIG. 4 illustrates a possible implementation for the variable voltage source.

FIG. 4 illustrates a possible implementation for the supply adjuster 206, using a voltage control block 401 and a voltage regulator 403. Regardless of how the exposure level determiner 207 is implemented (i.e. the implementation of FIG. 3A, 3B, or any other implementation), the exposure level indicator 209 will be representative of the exposure level in which the image 211 was captured. The voltage control block 401 generates a voltage reference 405, based on the exposure level indicator 209. The optimal value for the voltage reference 405 is one that minimizes pixel noise in the pixel array 203 without compromising its dynamic range. These optimal values can be determined for the system beforehand and stored in a look-up memory table within the voltage control block 401.

Alternatively, an algorithm may be developed for calculating the optimal value for the voltage reference 405, based on the exposure level indicator 209. This algorithm may be implemented in hardware circuitry or software within voltage control block 401. An exemplary algorithm would be a comparison function. The voltage control block 401 could include a comparator that compares the exposure level indicator 209 to a threshold value. If the exposure level indicator 209 is greater than the threshold value, then the voltage reference 405 is increased. If the exposure level indicator 209 is less than the threshold value, then the voltage reference 405 is decreased.

The voltage regulator 403 regulates Array Vdd 204 to match the optimal voltage reference 405. The voltage regulator 403 has an operational amplifier (op-amp) 407 that drives the gate of a transistor 409. The negative input of the op-amp 407 is connected to the drain of the transistor 409, while the source of the transistor 409 is connected to the voltage supply 205. The voltage regulator 403 is a well-known circuit in the art, and the implementation illustrated here is just one of many possible designs.

Figure 5:
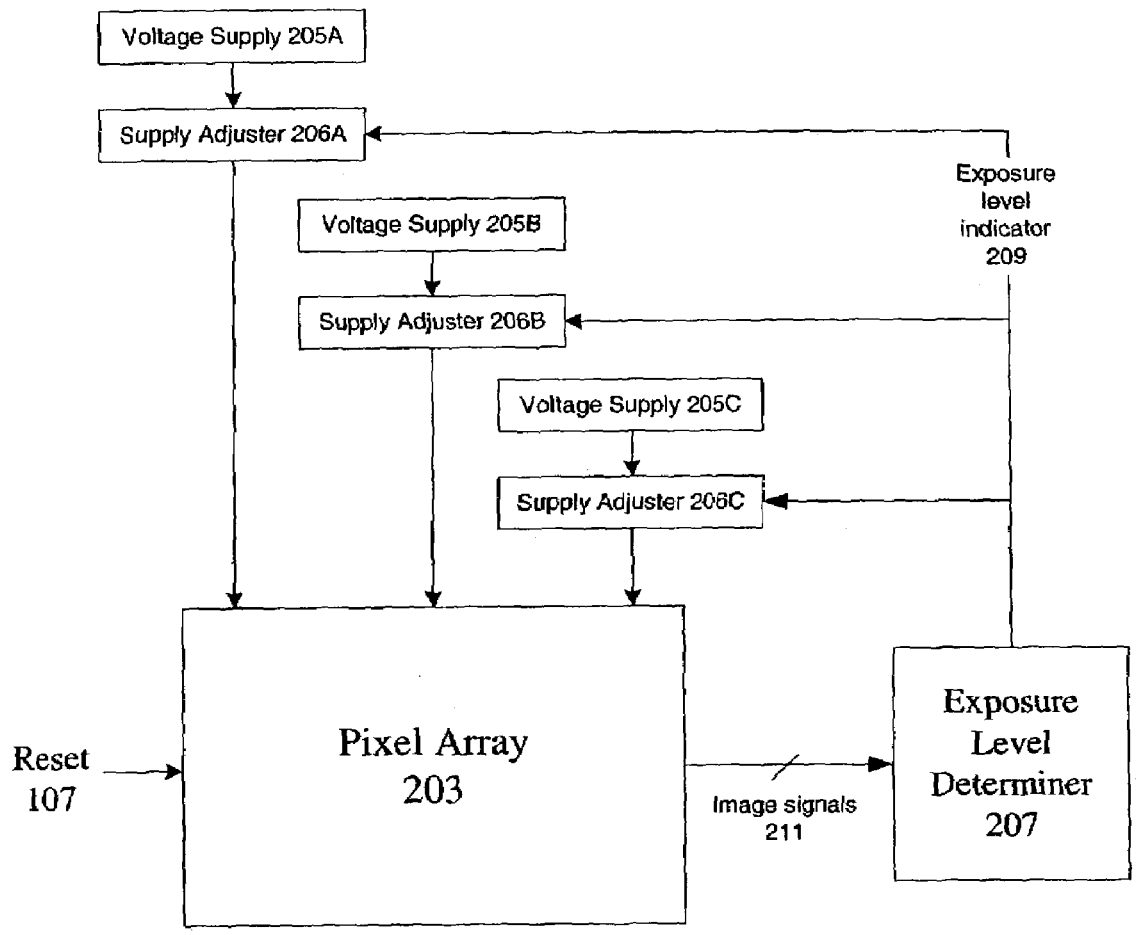
FIG. 5 illustrates a pixel array having multiple voltage supplies.

In some image sensors, the auxiliary circuitry for a pixel array (such as the drivers, buffers, multiplexers, etc.) may derive its power from one or more distinct voltage supplies. Each of these voltage supplies may also be optimized to reduce noise levels in response to the exposure level of the pixel array. FIG. 5 illustrates a pixel array 203 having multiple voltage supplies 205A, 205B, and 205C. Each voltage supply is adjusted by a supply adjuster 206A, 206B, and 206C, respectively, to optimize the voltage supply for the exposure level indicated by the exposure level indicator 209.

In another embodiment of the present invention, the pixel array may be designed so that its reset voltage is not a function of a voltage supply to the pixel array. However, the noise level of the pixel array remains dependent on the reset voltage—the noise increases with the reset voltage. In such configurations, the reset voltage may also be optimized independently of the voltage supply to reduce noise levels. For example, the reset voltage is a function of the reset signal 208 in some image sensors. A reset voltage adjuster, similar to the supply adjuster 206, can be used to adjust the reset signal 208 in response to the exposure level of the pixel array.

Figure 6:
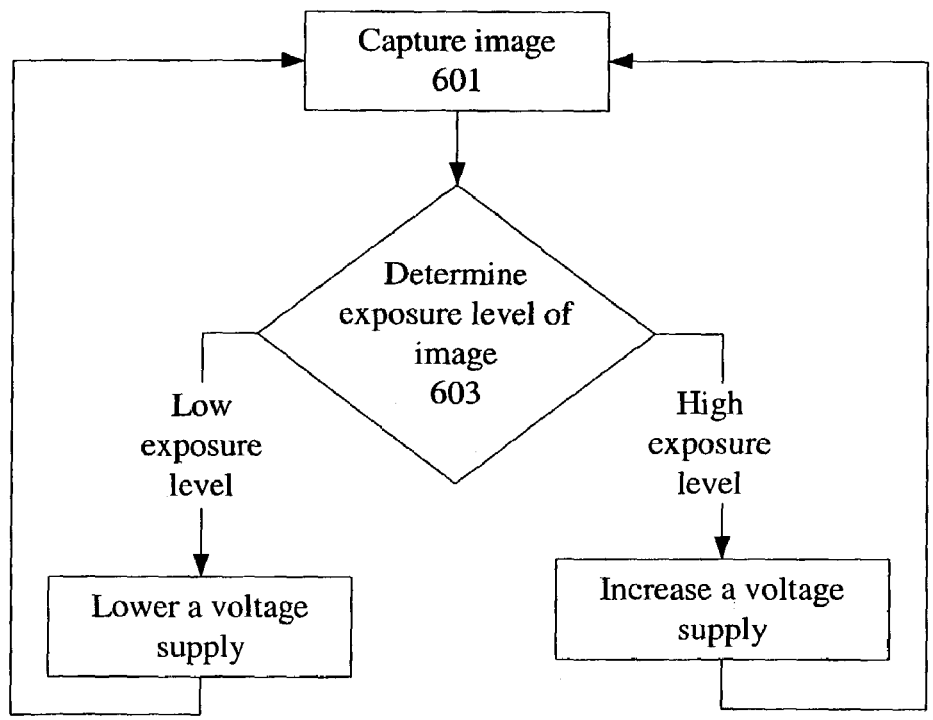
FIG. 6 illustrates a process flow chart according to the present invention.

FIG. 6 illustrates a process flow chart according to the present invention. First, in step 601, an image is captured on a pixel array. Next, in step 603, the image is analyzed to determine its exposure level. If the exposure level is low, then a voltage supply of the pixel array is lowered. If the exposure level is relatively high, then the voltage supply can be increased. After adjustment, the next image can be captured and the process begins again at step 601. When the reset voltage is not a function of the voltage supply, the reset voltage may also be adjusted independently of the voltage supply.

Although the present invention has been described in detail with reference to particular preferred embodiments, persons possessing ordinary skill in the art to which this invention pertains will appreciate that various modifications and enhancements may be made without departing from the spirit and scope of the claims that follow.

We claim:

1. A system, comprising:
    a pixel array for capturing an image and outputting an image signal corresponding to the captured image, the pixel array being a complementary metal oxide semiconductor (CMOS) pixel array;
    a programmable gain loop receiving the outputted image signal, as an analog image signal, and amplifying and digitizing the analog image signal to generate a digital image signal, the programmable gain loop including a gain control signal derived from the digital image signal for adjusting a gain of the programmable gain loop; and
    a supply adjuster for adjusting a voltage supply to the pixel array to provide a voltage having a value which is applied to the pixel array prior to and during an interval in which the image is being captured and read, the value being different from and between a minimum value and a maximum value and being determined in response to the gain control signal from the programmable gain loop.

2. The system as in claim 1, wherein the programmable gain loop includes:
    a programmable gain amplifier for amplifying signals from the pixel array;
    an analog-to-digital converter for receiving the amplified signals and converting the amplified signals to digitized signals; and
    a gain control block for adjusting gain of the programmable gain amplifier to generate the gain control signal.

3. The system as in claim 2, wherein the gain control block determines a mean level of the digitized signals and adjusts the gain of the programmable gain amplifier when the mean level of the digitized signals does not meet a target value.

4. The system as in claim 3, wherein the gain control block increases the gain of the programmable gain amplifier when the mean level of the digitized signals is below a target value, and
    decreases the gain of the programmable gain amplifier when the mean level of the digitized signals is above a target value.

5. The system as in claim 4, wherein the gain control block includes a comparator for comparing the mean level of the digitized signals to a target value.

6. The system as in claim 1, wherein the supply adjuster decreases the voltage supply when the gain control signal indicates that an exposure level of the pixel array is below a threshold value, and
    increases the voltage supply when the gain control signal indicates that the exposure level of the pixel array is above the threshold value.

7. The system as in claim 1, wherein the supply adjuster includes:
    a voltage control block for generating an optimal voltage reference based on the gain control signal; and
    a voltage regulator for adjusting the voltage supply to match the optimal voltage reference.

8. The system as in claim 7, wherein the voltage control block includes a lookup table for generating the optimal voltage reference.

9. The system as in claim 7, wherein the voltage control block includes a comparator for comparing the gain control signal to a threshold value.

10. The system of claim 1, further comprising:
    a reset voltage adjuster for adjusting the reset voltage of the pixel array, the reset voltage being independent of the voltage supply, in response to the gain control signal.

11. The system as in claim 1, the supply adjuster further including:
    a voltage control block that receives the gain control signal and that generates an adjustable voltage reference corresponding to the gain control signal, wherein a voltage follower maintains the voltage supply at the voltage level of the adjustable voltage reference as the adjustable reference value is changed.

12. The system as in claim 11, wherein the voltage supply is adjusted continuously or in steps to match the adjustable voltage reference.

13. A method for optimizing the voltage supply of a pixel array, which captures an image comprising:
    supplying the pixel array with a reset voltage, the pixel array being a complementary metal oxide semiconductor (CMOS) pixel array;
    capturing an image with the pixel array;
    outputting the captured image, as an outputted image signal;
    amplifying the outputted image signal in a programmable gain loop;
    generating a gain control signal derived from the amplified image signal for adjusting a gain of the programmable gain loop;
    generating, by a voltage control block, an adjustable voltage reference in response to the gain control signal;
    matching, using a voltage follower, the supplied voltage to a level between a maximum voltage level and a minimum voltage level, the supplied voltage being adjusted prior to and during an interval in which the image is being captured and read in response to the gain control signal, the adjusted level of the voltage supply being different from either the maximum or minimum supply levels and corresponding to the gain control signal.

14. The method as in claim 13, wherein adjusting the supplied voltage includes:
    decreasing the supplied voltage when a level of the gain control signal is below a threshold value, and
    increasing the supplied voltage when the level of the gain control signal is above the threshold value.

15. The method as in claim 13, wherein generating the gain control signal includes:
    amplifying signals from the pixel array according to a gain setting;
    converting the amplified signals to digitized signals;
    determining a mean level of the digitized signals; and
    adjusting the gain setting in response to the mean level of the digitized signals to generate the gain control signal.

16. The method as in claim 13, further comprising:
    adjusting a reset voltage of the pixel array in response to the level of the gain control signal.

17. A system, comprising:
a pixel array for capturing an image and outputting an image signal, the pixel array being a complementary metal oxide semiconductor (CMOS) pixel array;
a programmable gain loop for adjusting a gain of the image signal and including a gain controller for determining a gain of the programmable gain loop, and generating gain control signal derived from the outputted image signal; and
a supply adjuster for adjusting a voltage supply to the pixel array to provide a voltage having a value which is applied to the pixel array prior to and during an interval in which the image is being captured and read, the value being determined in response to the gain control signal;
wherein the gain controller includes a comparator for comparing a pixel array value to a threshold value, the pixel array value chosen from a maximum value of the signals from the pixel array.

18. A system, comprising:
a pixel array for capturing an image, the pixel array being a complementary metal oxide semiconductor (CMOS) pixel array;
an exposure level determiner for determining the exposure level of the pixel array, and generating an exposure level indicator signal; and
a supply adjuster for adjusting a voltage supply to the pixel array to provide a voltage having a value which is applied to the pixel array prior to and during an interval in which the image is being captured and read, the value being different from and between a minimum value and a maximum value and being determined in response to the exposure level indicator, wherein the supply adjuster includes:
a voltage control block that receives the exposure level indicator signal and that generates an adjustable voltage reference according to the exposure level indicator signal; and
the voltage follower having first and second inputs and an output, the output of the voltage follower being coupled to: (1) the reset voltage supply and (2) the first input of the voltage follower, the voltage control block being coupled to the second input such that the output voltage from the supply adjuster matches the adjustable voltage reference generated by the voltage control block.

19. The system as in claim 18, wherein the exposure level determiner includes a comparator for comparing a pixel array value to a threshold value, the pixel array value chosen from a mean, median and maximum value of the signals from the pixel array.

* * * * *